Dec. 29, 1936.  C. W. STRONG  2,065,544
NUT SHELLING MACHINE
Filed April 7, 1934  5 Sheets-Sheet 1

WITNESS:

INVENTOR
CARLL W. STRONG.
BY
Ely + Pattison.
ATTORNEYS

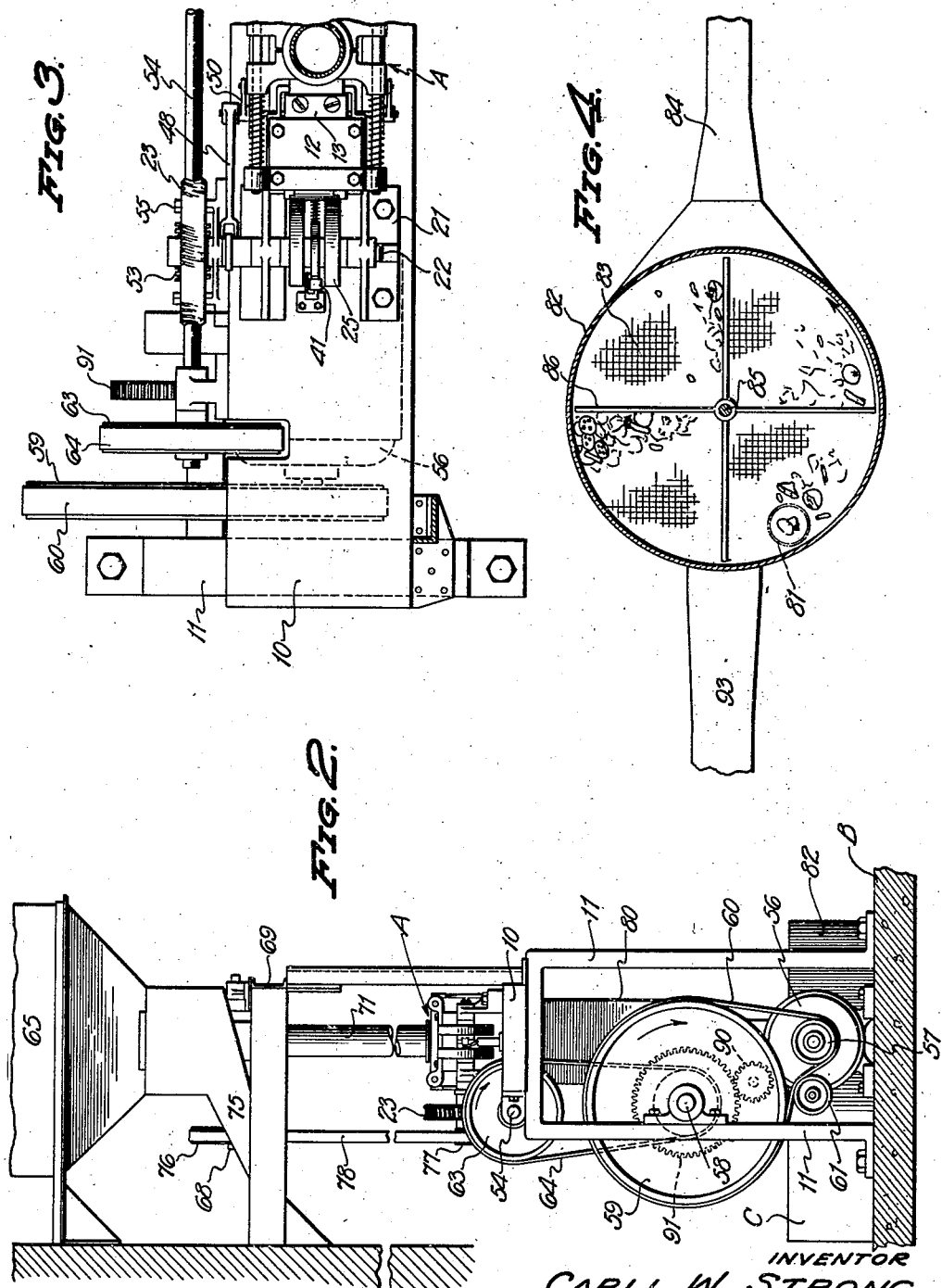

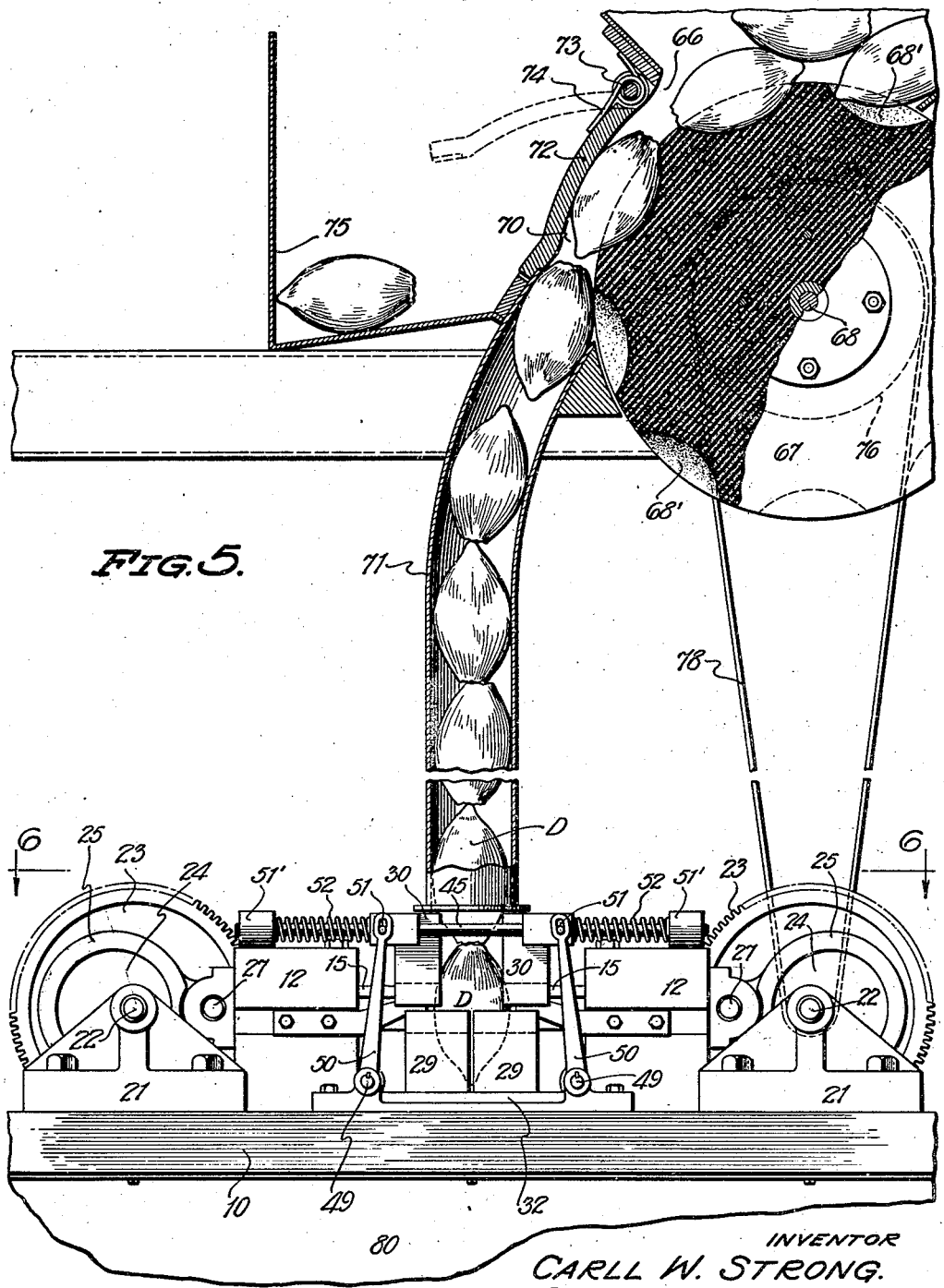

Dec. 29, 1936. C. W. STRONG 2,065,544
NUT SHELLING MACHINE
Filed April 7, 1934 5 Sheets-Sheet 4
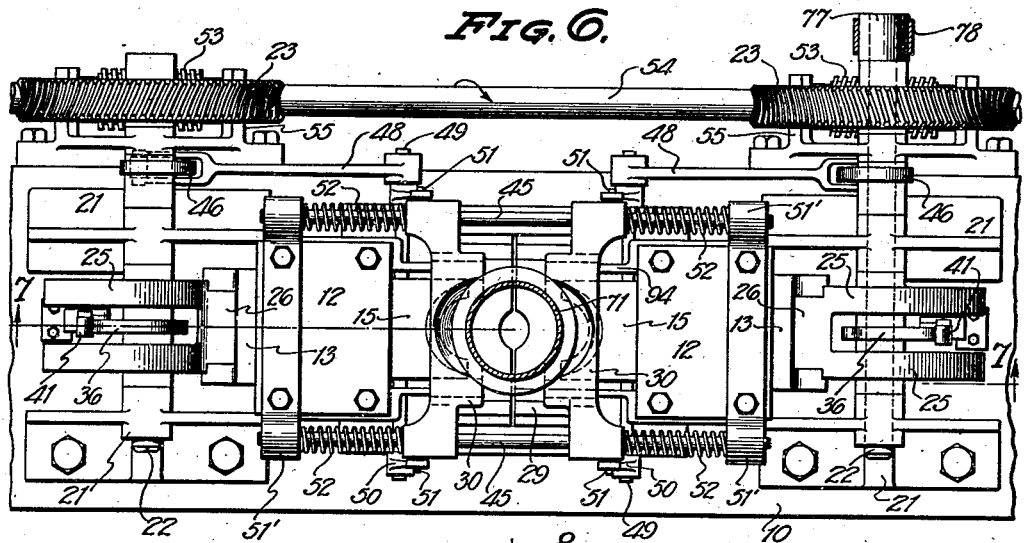
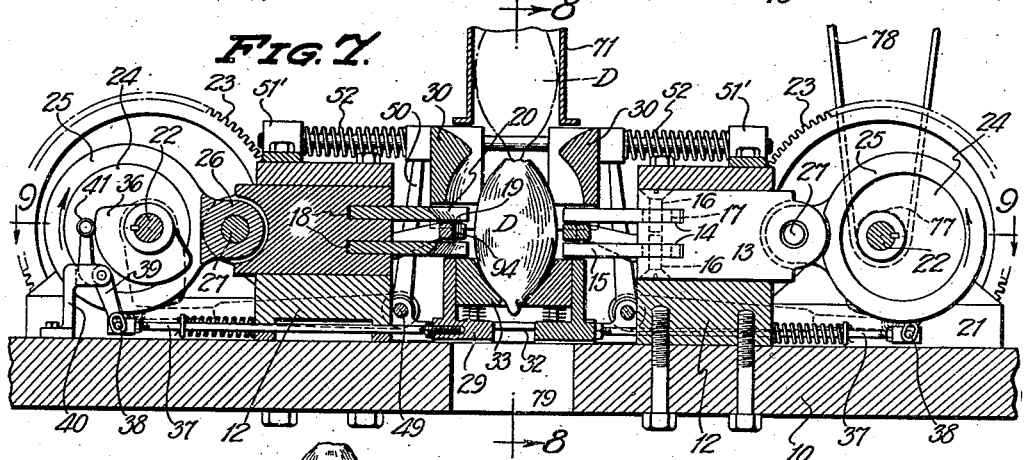
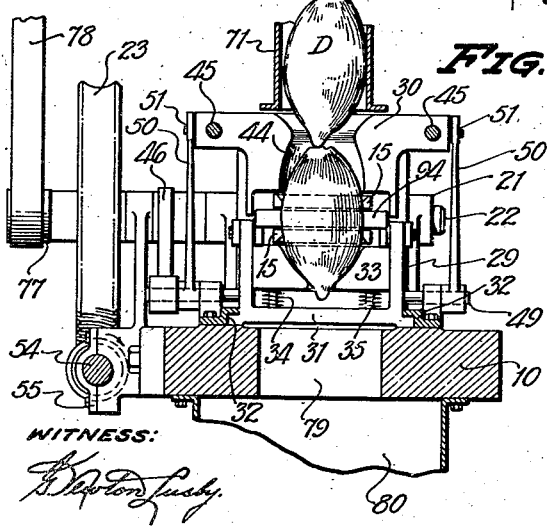
INVENTOR
CARLL W. STRONG.
BY
Ely & Pattison
ATTORNEYS Dec. 29, 1936.　　　　C. W. STRONG　　　　2,065,544
NUT SHELLING MACHINE
Filed April 7, 1934　　　5 Sheets-Sheet 5

INVENTOR
CARLL W. STRONG.
BY
Ely & Pattison
ATTORNEYS

WITNESS:

Patented Dec. 29, 1936

2,065,544

UNITED STATES PATENT OFFICE 2,065,544

NUT SHELLING MACHINE

Carll W. Strong, Watchung, N. J.

Application April 7, 1934, Serial No. 719,435

7 Claims. (Cl. 146—10)

This invention relates to improvements in nut shelling machines, and has particular reference to such machines for the shelling of nuts of the hard shell type.

In a variety of palm nuts such as the cohune, babassu and coquito, the shell or pericarp is extremely hard while the kernels or meats enclosed therein are rich in vegetable oil. I understand from the prior art that machines have been devised for cracking nuts of the hard shell variety, but they have failed to meet the commercial requirements for the successful cracking of the shell and removal of the meat intact without injury thereto. It is therefore one of the main objects of this invention to provide a machine which will positively cut the shell into a plurality of separate sections to free the meat or kernel therefrom intact, the depth of the cut being less than the thickness of the shell to avoid injury to the meat or kernel.

Another feature of the invention resides in a pair of spaced reciprocating knives arranged on the same plane which cooperate to simultaneously attack and cut a nut transversely of its longitudinal axis from opposite sides when fed to a position of rest in the path of the knives.

Another feature of the invention is the provision of a novel feeding means whereby the nuts may be singly and positively fed to a position in the path of the reciprocatory knives to avoid idle operation of the cutting mechanism due to jamming of the nuts in their passage from the supply hopper.

A further feature of the invention is to provide an agitating and screening device for receiving the shelled nuts for shaking loose any kernels which might not be freed during the cutting operation, and for finally separating the free kernels from the nut shells.

A further feature is to provide a nut shelling mechanism which embodies a nut receiving and holding mechanism to which the nuts to be shelled are individually fed by gravity, opposed reciprocating cutters for cutting the nut held by said holding mechanism, and means for releasing the shelled nut from the holding mechanism after operation of the cutters.

A still further object of the invention is to provide a nut shelling machine which is relatively simple and inexpensive of construction, and strong and durable for the purposes to which it is adapted for use.

With these and other objects in view, the invention resides in the certain novel combination and arrangement of parts, the essential features of which are described in the following specification, are particularly pointed out in the appended claims, and are illustrated in the accompanying drawings, in which:

Figure 2 is an end elevational view looking from the left end of Figure 1.

Figure 3 is a fragmentary horizontal sectional view on the line 3—3 of Figure 1.

Figure 4 is a horizontal sectional view on the line 4—4 of Figure 1.

Figure 5 is an enlarged sectional elevational view of one of the nut feeding and shelling units.

Figure 6 is a horizontal sectional view on the line 6—6 of Figure 5.

Figure 7 is a vertical sectional view on the line 7—7 of Figure 6.

Figure 8 is a vertical transverse sectional view on the line 8—8 of Figure 7.

Figure 13 is a perspective view of a modified form of cutter.

Figure 1:
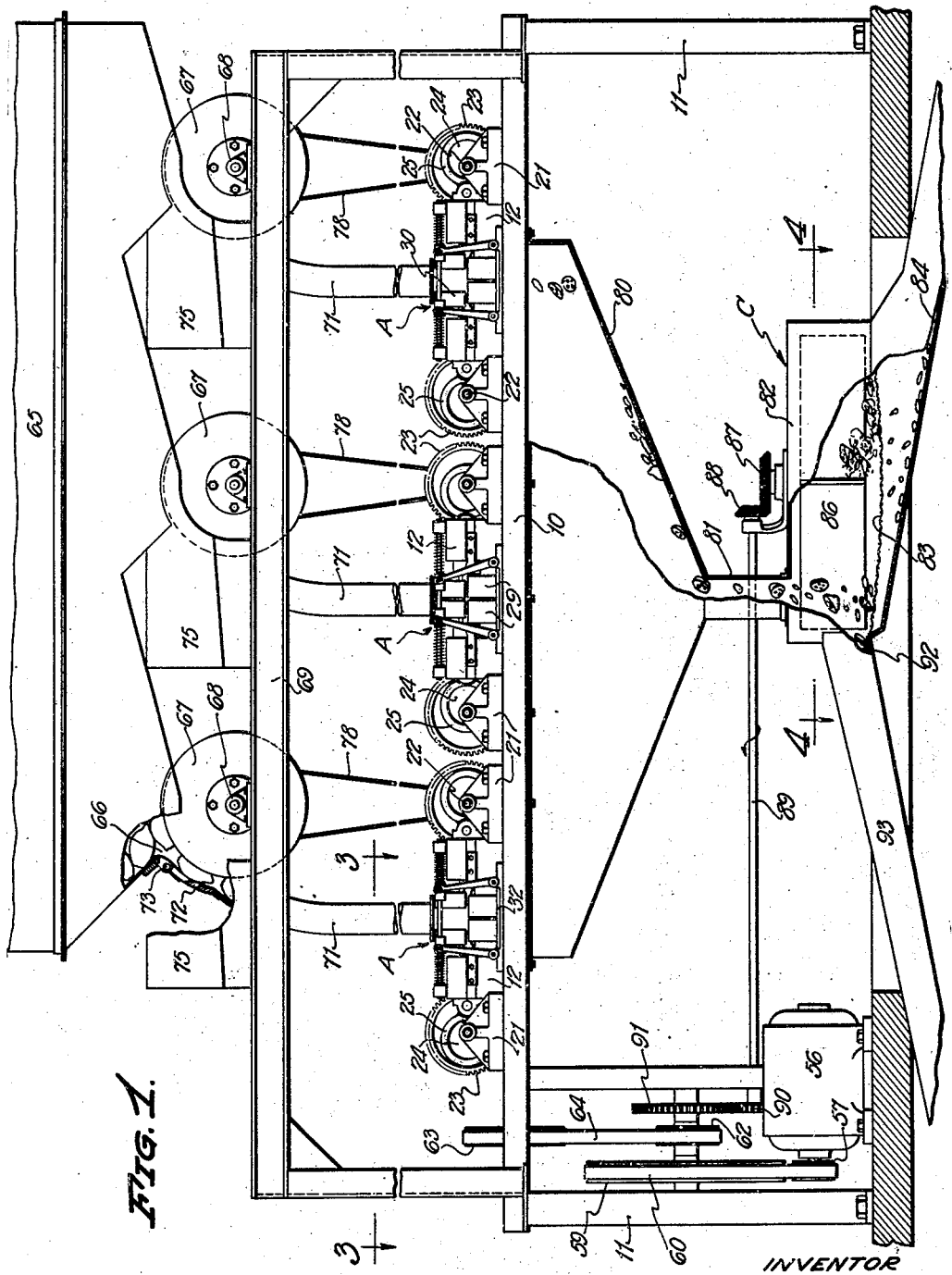
Figure 1 is a front elevational view of the nut shelling machine with parts broken away and in section.

Referring to the drawings by reference characters, the numeral 10 designates the bed plate of the nut cracking machine which is supported in an elevated position upon legs 11. Mounted in longitudinal alinement upon the bed plate 10 are a plurality of nut cracking units A and by reference to Figure 1 of the drawings, three of such units are shown but more or less may be used depending upon the capacity of a desired nut cracking machine. In view of the fact that each of the nut cracking units A are identical in construction, a description of one will suffice for the others.

Each nut cracking unit A includes a pair of spaced alined bearings 12 mounted on the top of the bed plate 10 which slidably support reciprocable cutter heads 13. The inwardly facing ends of the cutter heads 13 are each provided with spaced horizontally disposed slots or recesses 14 into which the inner ends of cutter knives 15 extend, the said knives being removably secured in position by screws 16 which thread down through the top of the head 13 and pass through elongated slots 17 in the cutter blades 15. By this arrangement, adjustment of the cutter knives may be effected to vary the depth of the cut as will be apparent from the following explanation and to provide a solid backing for the cutter knives when in a forwardly adjusted position, I provide shims 18 which are interposed between the inner ends of the cutter knives, and the adjacent walls of the slots 14.

Each cutter blade 15 has its outer end provided with a semi-circular shaped notch 19, the walls of the notch being beveled outwardly as at 20 to provide a sharp cutting and wedging knife edge which functions in a manner to be hereinafter explained.

It is desired to impart simultaneous reciprocation to the opposed cutter heads 13, that is, the cutter heads are to move inwardly toward each other at the same time and at the same rate of speed and are to be moved away from each other at the same rate of speed in order to obtain the desired cutting and release action. The mechanism for imparting such movement to the cutters will now be explained.

Journaled in transversely alined bearings 21 mounted on the top of the bed plate 10 and disposed outwardly beyond the bearings 12 are parallel countershafts 22, one of the ends of the shafts extending beyond one of the longitudinal sides of the bed plate 10 and carrying a worm gear 23 for operative connection with a driving mechanism to be described hereinafter. Fixed to each shaft 22 is a pair of spaced identical eccentric cams 24, while extending about the eccentrics are eccentric ring straps 25 provided with bearing ears 26 which are pivoted to the outer ends of the cutter heads as at 27. Thus it will be seen that upon rotation of the shafts 22, the cams 24 will impart a reciprocating movement to the cutter heads 13. The cams 24 on the respective shafts 22 of each cutter unit are so positioned as to impart simultaneous movement of the two cutter heads alternately toward and away from each other.

Interposed between the coacting reciprocating cutters and disposed out of the plane of movement thereof, is a nut holding and releasing mechanism which includes a lower set of coacting seat members 29 and an upper set of coacting jaws 30. The seat members 29 comprise a substantially U-shaped frame 31 slidably mounted upon the bed plate 10 by means of guide rails 32. Mounted in each frame 31 for downward yielding movement, is a seat element 33 normally held in a raised position by springs 34 and guided in its vertical movement by pins 35. Each of the seat elements 33 has a base curved to receive the correspondingly curved end of a nut to be cracked and the two coacting seat members 33 when in closed position as shown in Figure 7 form a seat or rest for supporting a nut in a position to be acted upon by the reciprocating cutter members.

Figure 10:
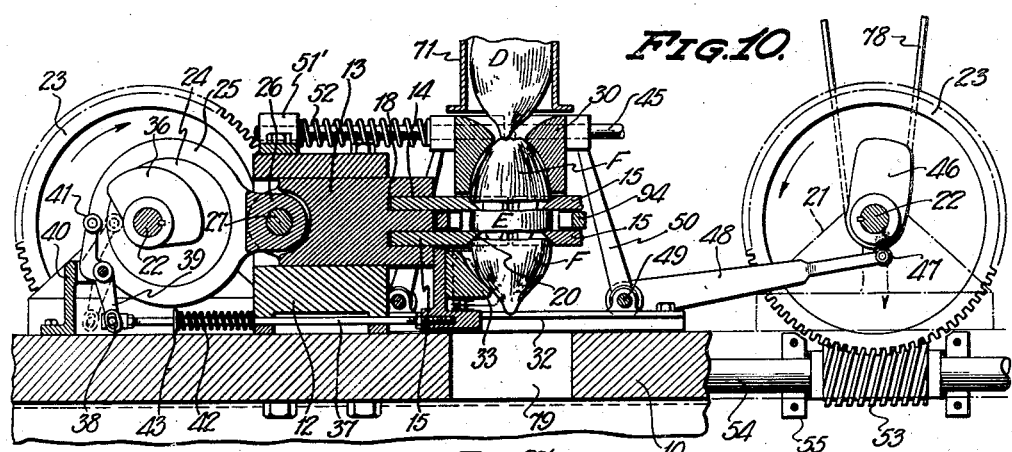
Figure 10 is a vertical sectional view on the line 10—10 of Figure 9.

For imparting simultaneous sliding movement to the seat members 33 in timed relation to the reciprocations of the cutters, there is provided on each shaft 22, a cam 36, the said cams being mounted on the shafts 22 intermediate the respective sets of eccentrics 24. Fixed to and extending outwardly from the seat frames 31 are rods 37, the same being slidably mounted in the bearings 12, the outer ends of the said rods being connected by pin and slot connections 38 to the lower arm of rock levers 39 pivoted in brackets 40 while the upper ends of the rock levers carry rollers 41 which respectively engage the cams 36 during rotation of the shaft 22. The cams 36 are intended to actuate the rock levers 39 to cause the rods 37 to move toward each other and position the seat elements 33 in close proximity to each other to receive a nut to be cracked. When in this closed position, and after a nut has been cracked, the cams clear the rollers 41, the seat members are moved by springs 42 into engagement with the inner ends of the cutter heads 13 as shown in Figure 10 and it is therefore unnecessary that the cams 36 constantly engage the rollers 41 of the rock levers 39. Upon the retractive movement of the cutter heads 13, the seat members will move away from each other by reason of the action of the springs 42 mounted on each rod 37 and which springs are interposed between the outer ends of the bearings 12 and fixed collars 43 carried by the respective rods 37.

The jaw members 30 above referred to are of substantial T-shape in front elevation as shown in Figure 8 of the drawings, and the inner faces of the jaws are recessed as at 44 to conform with the curvature at one end of a nut to be shelled. The recessed portions 44 are of such depth that when the jaw members are in a closed position as shown in Figure 10, the cavity formed by the coacting jaw members remains open at the top to permit the next nut which is adapted to enter the machine for cutting to rest upon the nut being cracked. The jaw members 30 are slidably mounted upon spaced longitudinally extending parallel rods 45 and are slidable toward and away from each other in timed relation to the reciprocation of the cutters and with respect to the movements of the seat members 29. The mechanism about to be described is so timed that after a nut to be cracked is seated upon the closed seat members 29, the jaws 30 move inwardly to close about the top end of the nut and which jaws coact with the seat members to firmly hold the nut to be cracked in the path of simultaneous inward movement of the reciprocating cutter knives 15. For imparting this sliding movement to the respective jaws 30, there is provided a cam 46 on each shaft 22 and which cam is disposed beyond one of the bearings 21 as best seen in Figure 6 of the drawings. Riding against each cam 46 is a roller 47 carried at one end of a lever 48, the opposite end of the lever being fixed to a countershaft 49 extending transversely above the guide rails 32. Thus it will be seen that by rotation of the cam 46 with its shaft 22, a rocking movement will be imparted to the lever 48 which in turn imparts an oscillating turning movement to the shaft 49. Fixed to each shaft 49 and respectively disposed adjacent opposite ends thereof, are levers 50, the upper ends of the levers 50 being connected by pin and slot connections 51 to a point adjacent the top of the jaws 30. Encircling the rods 45 and interposed between the jaw members 30 and rod bearings 51', are springs 52, which springs have a tendency to normally urge the coacting jaws to a closed position, thus the cams 46 act upon the levers 48 for turning the shafts 49 to move the levers 50 in a direction against the tension of the springs 52, or in other words to move the jaw members from a closed to open position.

The two worm gears 23 carried by the respective countershafts 22 of each nut cracker unit have meshing engagement with worms 53 mounted on a driven shaft 54 journaled in bearings 55 and which shaft extends longitudinally of the bed plate 10 and constitutes a common driving shaft for all of the nut cracking units of the machine.

The power drive from a source of power to the shaft 54 is derived in the following manner. Mounted upon the floor or support B on which the machine is mounted, is an electric motor 56, the armature shaft of which carries a driving pulley 57. Journaled in bearings beneath the bed plate 10 is a countershaft 58 on which a large pulley wheel 59 is mounted. A pulley belt 60 passes over the wheel 59 and over the driving pulley wheel 57, the belt being held under tension by a tension wheel 61. Also fixed to the shaft 58 is a smaller pulley wheel 62 while disposed in vertical alinement with the pulley wheel 62 is a slightly larger pulley wheel 63 fixed adjacent one end of the shaft 54. Passing over the alined pulley wheels 63 and 62, is a pulley belt 64. Thus it will be seen that power will be transmitted from the motor 56 to the shaft 58 and thence from the shaft 58 to the driving shaft 54 through a series of pulleys and belts, but any other form of drive may be substituted therefor for imparting driving rotation to the worm shaft 54.

It is essential to the successful operation of the machine that the nuts to be cracked are fed endwise to the nut supporting seats 29 and that the said nuts be fed individually. For this purpose, I provide a novel feeding mechanism which includes a feed hopper 65 which is common to all of the feed units for the respective nut cracking units, and in view of the fact that all of the feeding units are identical, a description of one will suffice for the others. The hopper 65 is supported in an elevated position above the nut cracking units A, and is provided with a series of feed outlets 66, there being one for each feeding mechanism, the walls of the bottom of the hopper 65 being inclined toward the respective outlets 66. Associated with each outlet 66, is a nut feed wheel 67, journaled in bearings 68 mounted upon a frame structure 69 rising from the bed plate 10. The feed wheel 67 is constructed of hard but yieldable rubber, and has its periphery provided with a series of spaced concave recesses or pockets 68' of a shape to conform to the general contour of the side of the nut to be cracked. The wheel 67 substantially fills the outlet opening 66 but is spaced from the walls thereof to provide a restricted passage 70 through which the nuts must pass to the vertical feed tube 71, the lower end of the feed tube terminating on a plane directly above the jaws 30 and in vertical alinement with the seat formed when the seat members 29 are in closed position. This construction is clearly shown in Figure 5 of the drawings. The outer wall of the restricted passage 70 consists of a door 72 pivotally supported at 73 and normally held closed by a spring 74. The tension of the spring 74 is sufficient to hold the door 72 closed during the normal feeding of the nuts through the restricted passage 70 to the top end of the feed tube 71 but in the event of any possible jamming of the nuts in the feed tube which would prevent the wheel 67 from feeding additional nuts thereto, any further feed of nuts to the tube is avoided as the pressure exerted upon the nuts fed to the jammed tube act upon the door 72 to cause the same to yieldingly move to an open position as shown in dotted lines in Figure 5, whereupon nuts which are picked up by the feed wheel 67 and are unable to pass to the feed tube 71 are discharged through the door and pass to a chute 75 from where they may pass onto a receptacle and again deposited into the hopper 65. The pockets 68' serve to correctly position the nuts for their entrance into the gravity feed tube 71 and unless a nut is seated in one of the pockets 68' it will not be carried to the feed tube, as before stated it is essential that the nuts be fed to the nut cracking units so that their longitudinal axis is disposed at right angles to the direction of cut of the reciprocating cutter.

For imparting rotation to the feed wheel 67, there is provided a pulley wheel 76 which is fixed to one end of the feed wheel shaft, while fixed to one of the shafts 22 of the nut cracker unit is a smaller pulley wheel 77, and passing over the pulley wheels 76 and 77 is an endless pulley belt 78. The ratio between the pulley wheels 76 and 77 is such as to feed nuts from the hopper to the feed tube 71 in proportion to the speed of the nut cracking unit. It is desired to have the feed tube 71 charged with nuts at all times in order that they may gravitate to successive position within the path of the reciprocating cutters. When the jaw members 30 are in closed position as illustrated in Figure 10 of the drawings, they also serve to close the lower discharge end of the gravity feed tube 71 and the said jaws move inwardly about the nut to be cracked to exclude any possibility of two nuts entering the nut holding mechanism.

The bed plate 10 directly beneath the nut holding mechanism and in alinement with the discharge end of the gravity feed tube 71 is provided with a discharge opening 79, and mounted beneath the bed plate 10 and common to all of the discharge openings 79 is a discharge hopper 80. Connected to the discharge hopper 80 through a vertical tube 81 is a shell beater and separator C. The device C includes a circulator casing 82 and the tube or pipe 81 enters through the top of the casing adjacent the annular side wall. The bottom of the casing 82 is of a mesh wire or screen 83, the openings of which are of a size to permit of the meats of the nuts to pass through to a discharge chute 84 from which the meats may be collected by placing a receptacle at the lower end of the chute. Extending into the casing 82 through the top thereof is a shaft 85, the inwardly extending portion of the shaft having a paddle wheel 86 fixed thereto and which is disposed in close proximity to the walls of the casing. The upper or outer end of the shaft 85 carries a gear 87 which is in constant mesh with a pinion gear 88 fixed to one end of a shaft 89, the opposite end of the shaft carrying a gear 90 which is in constant mesh with a driving gear 91 fixed to the countershaft 58. Thus power is transmitted to the shaft 89 through the gears 91 and 90 and thence to the paddle wheel 86 through the meshing gears 87 and 88, whereby the paddle wheel 86 is rotated during operation of the machine. The side wall of the casing 82 is provided with an outlet opening 92 to which the upper end of a discharge chute 93 is connected. The shelled nuts from the respective nut cracking units A pass to the casing 82 and are acted upon by the blades of the paddle wheel 86 to agitate the shelled nuts and to separate the meat or kernels from engagement with the shells in the event that they should become stuck after the cracking operation. As before stated, the meats or kernels of the nuts pass through the screen 83 and during rotation of the paddle wheel 86, the shells which are of a larger size are thrown out through the discharge opening 92 by means of centrifugal force, the said shells passing down the chute 93 to gravitate to the lower end thereof where they may be collected in a receptacle for disposal or any other use desired. As before stated, the machine is adapted to crack palm nuts such as the cohune, coquito and the babassu, all of which possess a shell or pericarp of extremely hard texture. It has therefore been a problem to construct a machine which will successfully crack or shell these types of nuts without injury to the meat or kernels, which is highly rich of vegetable oil, for if the kernel is injured in any way the oil immediately begins to flow, and is lost for commercial purposes.

Figure 9:
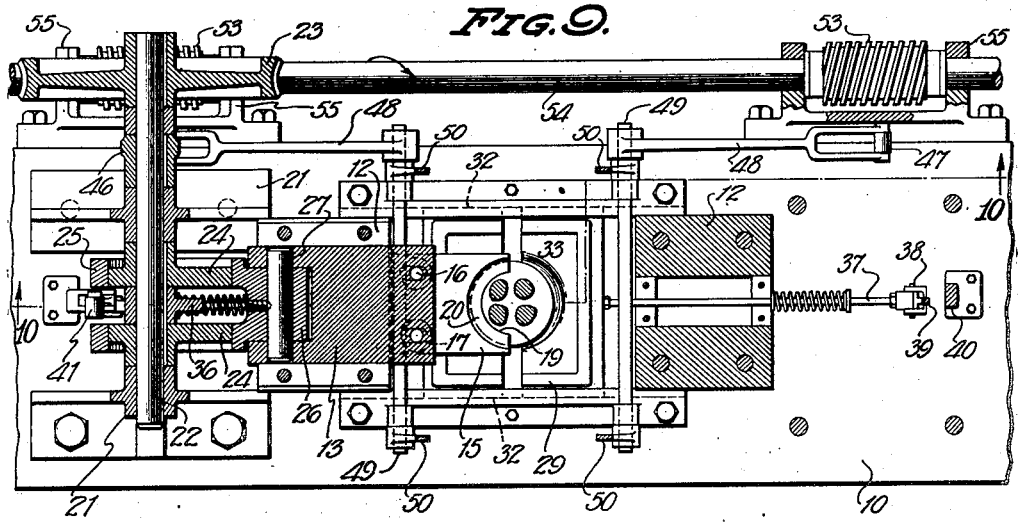
Figure 9 is a horizontal sectional view on the line 9—9 of Figure 7 but showing the position of the parts immediately after a nut cutting operation.

The operation of the machine is as follows. Assume that the motor 56 is in operation and is driving the shaft 54 in the direction of the arrows shown in Figures 6 and 9, whereupon the entire battery of cutter units A is in operation. With the parts of the cutter units shown in the position in Figure 5, wherein the jaws 30 are in open position, a nut D from the gravity feed tube 71 drops from the tube to a position upon the seat members 29, the said seat members being shown in Figure 5 as in a closed coacting seat forming position. After seating of the nuts, the cams 46 operate upon the levers 48 to release the arms 50, whereupon the springs 52 rapidly move the jaws 30 to the closed position shown in Figure 10. The nut is now firmly held in the path of the cutting knives 15, and at this point, the cams or eccentrics 24 act upon the cutter heads 12 to move them simultaneously toward each other and which in turn causes the notched knife edges 20 to attack the nut from opposite sides thereof and at right angles to the longitudinal axis of the nut. As before stated, each set of cutters consists of two spaced knives, whereupon the nut is cut into three sections as shown in Figure 10, namely a center ring like section E, and a pair of end sections F. The forward stroke of the knife blade is predeterminedly set according to the graded size or particular type of nut to be shelled so that the cut made upon the nut is predetermined and is always less than the thickness of the shell of the nut so as to avoid injury to the kernels or meat. As the knives cut into the shell of the nut, they also due to the beveled faces, serve to wedge the outer end cut sections apart in order to free the end sections F from the center ring section E. The seat members 33 and jaws 30 yield under any excess pressure to avoid breaking of the parts, and to also compensate for the separation of the end shell sections F from the intermediate ring section E. The yielding action is shown in dotted lines in Figure 10. During the cutting operation the cams 36 are free of the levers 39 and the seat members are being held in seat forming position by their engagement with the inner ends of the cutter heads 13, thus upon outward or retractive movement of the cutter members, the seat members 29 will also move away from each other or open up to release the shelled nut and allow it to drop through the opening 79 and into the shell beater and separator C. In the event that the center ring section E should become stuck between the knife blades of the respective cutters, it is freed by strippers 94 which extend between the blades of the respective cutters, and in the path of any ring section E stuck therebetween. After a shelled nut has been released and dropped through the opening 79, the cams 36 move into operative contact with the levers 39 to actuate the rods 37 and move the seat members 29 to closed position and as the seat members reach the closed position, the jaw members 30 are moved to open position against the tension of the springs 52 by engagement of the high points on the cams 46 striking the rollers 47 on the free ends of the levers 48. The position of the jaws 30 in open position is best seen in Figure 7 of the drawings, whereupon the lowermost nut in the gravity feed tube 71 is free to drop upon the closed seat members 29. This explanation of the operation covers one cycle, and further explanation of the same is not deemed necessary.

The feed mechanism has been clearly described hereinbefore, and further explanation is not believed necessary, other than to say that the feed is so timed with respect to the cracking unit that a nut is fed into the entrance end of the feed tube 71 during the interval between the cracking of the nuts, so that the tube is charged with nuts at all times.

I have also described the operation of the shell beater and separator which receives the shelled nuts and kernels after passing from the nut cracking units, and which serves to shake loose any kernels which may become stuck in the intermediate ring section E of a shelled nut, the kernels passing off through one chute and the shells through a separate chute.

Figure 11:
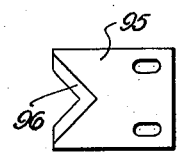
Figure 11 is a side elevational view of a modified form of cutting knife.

In Figure 11 of the drawings, I have illustrated a slightly modified form of cutter blades 95, which is substantially the same as the semi-circular notched blade shown in the preferred form, with the exception that the notched or knife edge 96 is of V-shape configuration.

Figure 12:
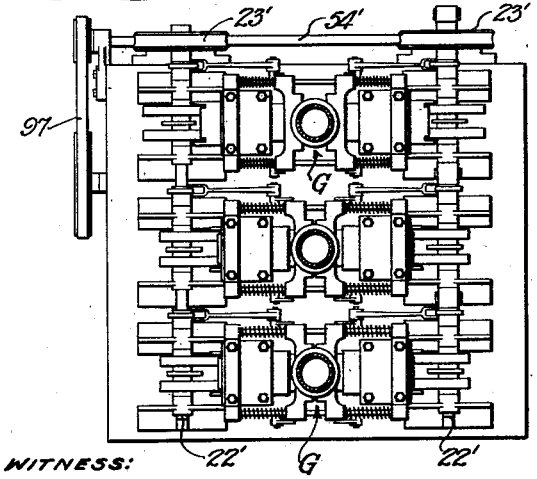
Figure 12 is a horizontal sectional top plan view of a modified form of power drive for the cutter units.

In Figure 12 of the drawings a modified form of drive is shown, wherein the driving shaft 54' drives the shafts 22' through worm gearing 23'. In this form, the drive for all of the nut cracker units G is taken off of the shafts 22'. In other words the shaft 22' is similar to the shafts 22 in the preferred form, but are common to all of the nut cracking units E. The shaft 54' is driven by a pulley means 97 from a drive shaft connected to a source of power.

In Figure 13 of the drawings, a still further modification of cutter has been shown for use in instances where it is desired to cut the nut transversely of its axis as shown in the preferred form together with a cut made longitudinally of the nut. In the drawings, the numeral 98 designates the horizontal or transverse cutters and 99 the vertical or longitudinal cutters, both of which fit into and are secured within a reciprocating cutter head 100, which is the equivalent to the cutter head 13 in the preferred form.

While I have shown and described what I deem to be the most practical embodiments of my invention, I wish it to be understood that such changes in construction may be resorted to as come within the scope of the appended claims.

Having thus described the invention, what I claim as new and desire to secure by Letters Patent of the United States, is:—

1. In a nut shelling machine, a pair of spaced alined coacting reciprocable cutters, means for simultaneously imparting reciprocatory movement to said cutters for alternate movement toward and away from each other, a releasable cupped shape nut rest below the plane of said cutters, a gravity feed tube adapted to be charged with nuts to be shelled and disposed above said nut rest, a pair of releasable recessed nut engaging jaws interposed between the lower discharge end of said feed tube and the upper plane of said cutters and adapted to close the discharge end of said feed tube when in nut gripping position, and actuating means operable in timed relation to the reciprocation of said cutters for successively releasing said jaws and said rest to release a shelled nut from said rest and allow a nut to gravitate from said feed tube to a position to be held by said rest and jaws in the path of cutting movement of said cutters.

2. In a nut shelling machine, a pair of opposed alined reciprocating cutters, each of said cutters including a pair of spaced parallel knife blades, oppositely beveled concave cutting edges on said knife blades, means for imparting simultaneous reciprocation to said cutters alternately toward and away from each other, and means for supporting an oval shaped nut to be shelled in the path of movement of said cutters toward each other and with its longitudinal axis at right angles to the plane of movement of said cutters, whereby the opposed beveled cutting edges of said knife blades will cut a nut into three sections transversely of its longitudinal axis and cause the end sections of the shell of the nut to be forced outwardly.

3. In a nut shelling machine, a bed plate having an opening therein, a pair of coacting recessed seat members movable to a closed position over said opening to provide a cup shaped nut supporting seat and movable to an open position clear of said opening to release a nut for passage therethrough, a pair of coacting recessed nut restraining members movably supported above and spaced from the plane of said pair of recessed seat members, means for opening and closing both of said pairs of recessed members in timed relation to receive, hold, and release a nut to be shelled, opposed reciprocating cutters mounted on a plane between said pairs of recessed members, and means for imparting reciprocatory movement to said cutters for cutting a nut held by said recessed members when in closed position.

4. In a nut shelling machine, means for yieldably engaging and supporting the opposed ends of an oval shaped nut to be shelled, a pair of opposed reciprocable cutters, each of said cutters including a pair of knife blades having opposed recessed beveled cutting edges for cutting the shell of a nut on two planes transversely of its longitudinal axis and for spreading the cut end sections of the nut outwardly, and means for imparting reciprocation to said cutters simultaneously toward and away from each other.

5. In a nut shelling machine, means for yieldably engaging and supporting a nut to be shelled, a pair of opposed reciprocable cutters, each of said cutters including a pair of spaced parallel knife blades having opposed recessed beveled cutting edges for cutting a nut on two planes and for spreading the cut sections of the nut outwardly, and means for imparting reciprocation to said cutters simultaneously toward and away from each other.

6. In a nut shelling machine, means for yieldably engaging and supporting the opposed ends of an oval shaped nut to be shelled, a pair of opposed reciprocable cutters, each of said cutters including a pair of spaced knife blades having opposed recessed beveled cutting edges for cutting the shell of a nut on two planes transversely of its longitudinal axis and for spreading the cut end sections of the nut outwardly, means for imparting reciprocation to said cutters simultaneously toward and away from each other, and fixed means on a plane intermediate the spaced knife blades of each of said cutters for stripping the intermediate severed nut section from between said blades during movement of said cutters away from each other.

7. In a nut shelling machine, a bed plate having an opening therein, a pair of spaced bearings secured to said bed plate and respectively disposed at opposite sides of said opening, a pair of horizontally disposed knife holders slidably mounted in said bearings, inwardly facing knife blades carried by said holders, a pair of shafts journaled in bearings on said bed plate respectively disposed at right angles to the plane of movement of said holders and beyond the bearings therefor, eccentrics fixed to said shafts, eccentric bands encircling the respective eccentrics and pivotally connected to the outer ends of the respective knife holders, and means for imparting simultaneous rotation to said shafts.

CARLL W. STRONG.